US006708078B1

(12) United States Patent
Skinger et al.

(10) Patent No.: US 6,708,078 B1
(45) Date of Patent: Mar. 16, 2004

(54) SYSTEM FOR DETERMINING STATUS OF FEEDERS IN A HIGH SPEED INSERTER

(75) Inventors: Gregory P. Skinger, Southbury, CT (US); John F. Pezzuti, Nugatuck, CT (US); Potter R. Noreen, Stratford, CT (US); John Kline, Danbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 10/280,201

(22) Filed: Oct. 25, 2002

(51) Int. Cl.[7] .................................................. G06F 7/00

(52) U.S. Cl. .................... 700/222; 700/220; 270/58.03; 270/52.04

(58) Field of Search ................................ 700/220, 222; 271/258.04; 270/52.04, 52.06, 58.02, 58.03

(56) References Cited

U.S. PATENT DOCUMENTS 5,058,873 A * 10/1991 Hewitt et al. ............ 270/52.13
5,984,507 A * 11/1999 Edens ........................ 700/220
6,094,894 A * 8/2000 Yates .......................... 53/505

* cited by examiner

*Primary Examiner*—Khoi H. Tran
(74) *Attorney, Agent, or Firm*—Michael J. Cummings; Charles R. Malandra, Jr.; Angelo N. Chaclas

(57) ABSTRACT

An apparatus and method are disclosed for preventing components in an inserter machine from causing the inserter machine to stop or function less than optimally due to lack of proper attention from an operator. Accordingly, various component conditions are categorized based upon two or more levels of urgency, and each component having such a condition signals the category of urgency to an operator.

22 Claims, 2 Drawing Sheets

SYSTEM FOR DETERMINING STATUS OF FEEDERS IN A HIGH SPEED INSERTER

TECHNICAL FIELD

The present invention relates to paper processing devices and systems, and more particularly to status indicators for inserter machines.

BACKGROUND OF THE INVENTION

The overall size of the latest and fastest inserter machines makes it highly desirable to have operator controls and indicators visible from all areas of the inserter. However, the use of trouble lights, such as simple red lamps, that light up whenever there is a problem in a particular area of a feeder are insufficient to describe the problem adequately and quickly. For example, a simple red light would not tell anyone if the material supply is merely low, as opposed to the insert supply having a condition where a jam is present or imminent.

Likewise, instead of simple red lamps or in addition to simple red lamps, detailed trouble indicators might be used, containing detailed written explanations on display screens that light up depending upon the type of problem. However, such a display will not quickly alert anyone about the urgency of the problem, until the explanation is read and adequately understood. Consequently, such a trouble indicator will not immediately alert an operator as to the urgency of the problem. When there are more than one written explanation lit up at the same time, the operator will not immediately know which of the explanations are so urgent that they must be read first.

The state of the known technology is exemplified by Hewitt et al. (U.S. Pat. No. 5,058,873) for a "Data Card and Mail Inserter System." Therein, a horn or other audible sound producing device is caused to sound as a warning for various error conditions. In addition, a message is provided in a display. However, audible sounds for various simultaneous problems would be cacophonous. Even if red lights were used in place of the audible sounds, simple red lights would give no indication of the urgency of the problems, nor would such lights indicate which problem or display the operator should investigate first.

Likewise, the invention of Yates (U.S. Pat. No. 6,094,894) for an "Envelope Inserting Apparatus" discloses an inserter that is provided with a visual and/or aural indicator device to produce a visual and/or aural warning to an operator when an envelope flap is detected as not open at an insertion station. Such a visual warning would read "check stacker," or the like. Thus Yates is analogous to Hewitt, and does not help an operator to immediately know how urgent a problem is, or to compare the urgencies of two simultaneous problems.

Another example of known technology is Edens (U.S. Pat. No. 5,984,507) for a "Mail processing system with diagnostic facilities." Therein, an external diagnostic device alerts an operator by way of an audible or visible alarm, and the operator can then go to the mail processing apparatus to perform the maintenance work. The external diagnostic device of Edens may comprise a screen, to display the nature of the work to be performed. Once again, this prior patent does not help an operator to immediately know how urgent a problem is, or to compare the urgencies of two simultaneous problems.

SUMMARY OF THE INVENTION

The present invention solves many of the problems of the existing technology, by providing a better apparatus and method for determining the status of a high speed inserter. The present inserter includes a number of modules, each having components that are capable of causing the inserter machine to stop, or to function less than optimally, unless attention is provided by a operator with some level of urgency. Each of these inserter components is equipped with at least one condition detection device to detect component conditions, which are then reported to an intermediate module that subsequently provides an urgency category signal to a visual signal device. The component's visual signal device provides a visual category signal indicating one of at least two urgency categories that differ from zero urgency.

In this way, component conditions are categorized by level of urgency, and an operator can immediately see how urgent a component condition is, without having to read or examine anything. This is especially useful when two or more components are simultaneously experiencing component conditions, and an operator wants to know which component he should go to first.

This method for providing better information to an inserter operator can be broken down into a set of basic steps: detecting a component condition, sending a condition detection signal indicative of the component condition, receiving the condition detection signal, providing an urgency category signal, receiving the urgency category signal, and providing a visual category signal indicative of one of at least two urgency categories that differ from zero urgency. In cases where a particular component will only experience component conditions falling into a single category of urgency, then the step of providing the urgency category signal will basically involve merely passing through the condition detection signal. On the other hand, if the particular component may experience component conditions having a variety of different urgencies, then the step of providing the urgency category signal will depend upon the particulars of the condition detection signal.

BEST MODE FOR CARRYING OUT THE INVENTION

Figure 1:
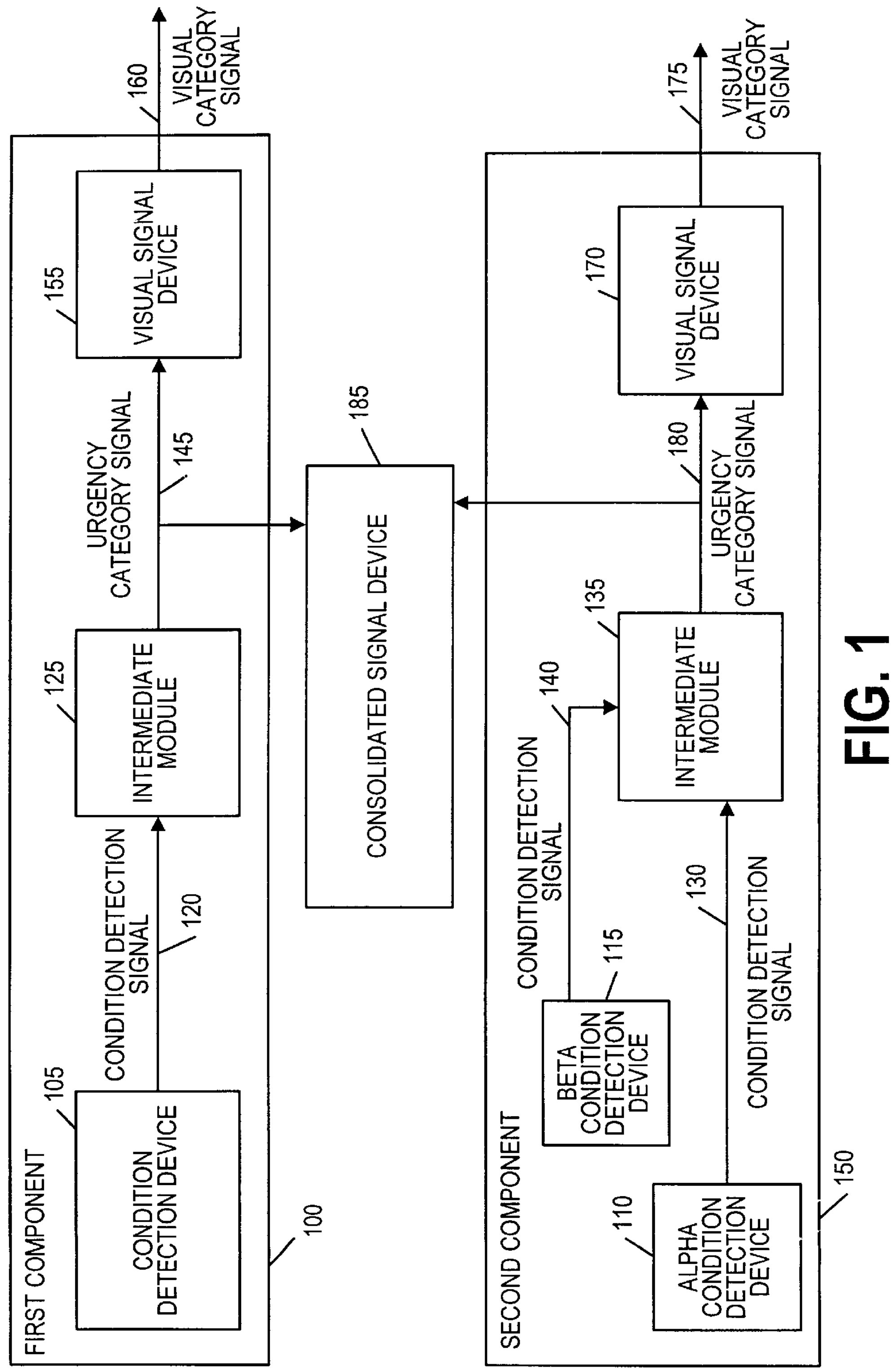
FIG. 1 is a diagram of the salient features of an inserter machine according to the present invention.
Figure 2:
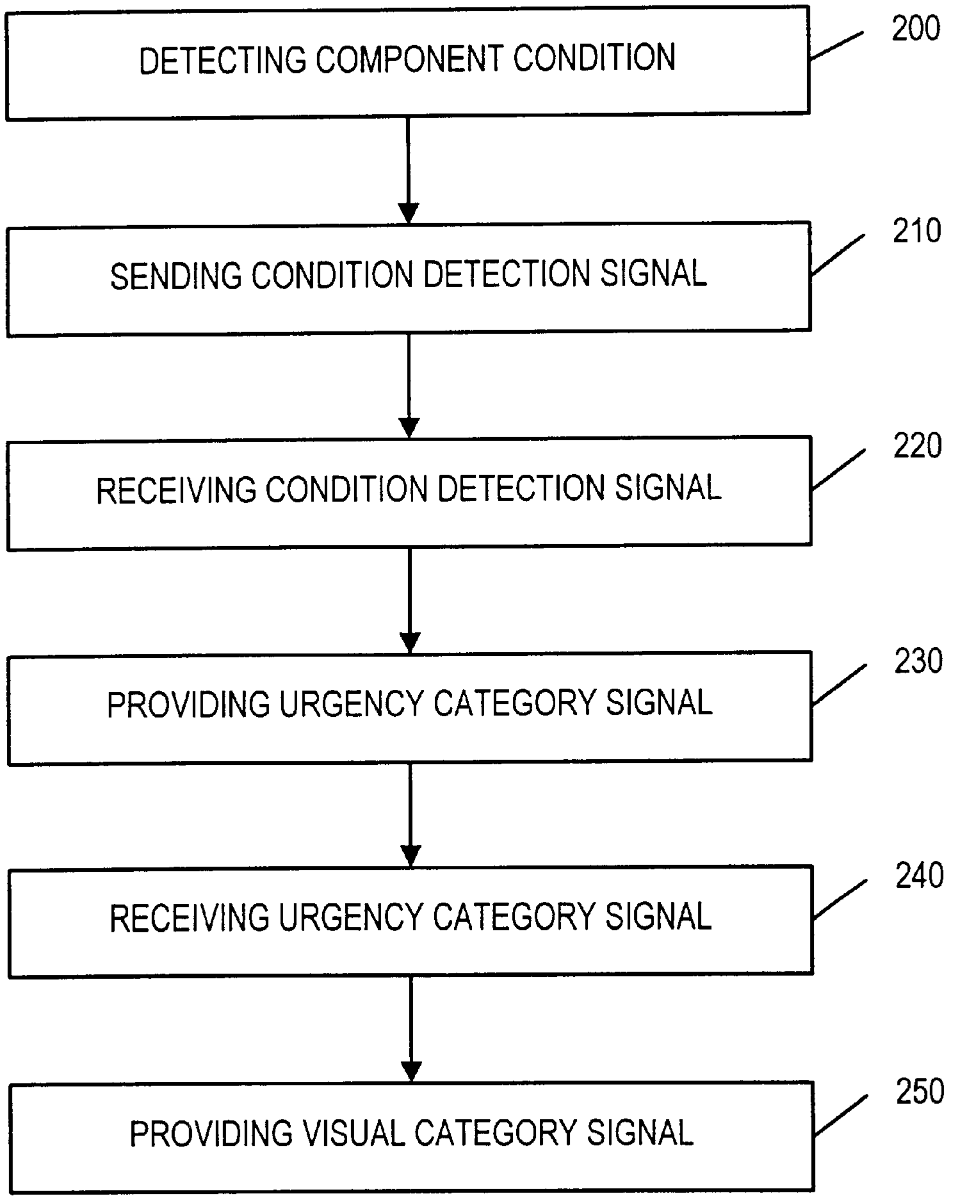
FIG. 2 is a flow chart of the present method for determining status of a high speed inserter.

As can be seen in FIG. 1 illustrating a best mode embodiment of the present invention, this invention deals with at least two components in a module of an inserter machine. The basic modules of an inserter machine are the input, chassis, insertion engine, and output. Each module consists of a set of components, such as: accumulator, buffer, sealer, et cetera. According to the best mode of the present invention, each component should be equipped with a visual signal device to get an operator's attention in the event a component condition requires attention, the visual signal device being physically located at the component where the operator is needed.

The first component 100 and the second component 150 shown in FIG. 1 have similar salient features. The first component 100 has a condition detection device 105 that detects problems in the component. Such problems might include a low supply, an open interlock, a jam, et cetera. Different components could have a different set of possible problems, and some components might have only one possible problem. For example, the second component 150 illustrates the possibility that a component may have a beta condition detection device 110 in addition to an alpha condition detection device 115.

Upon detecting a problem, the condition detection device 105 sends a condition detection signal 120 to an intermediate module 125. Likewise, in the second component 150, the alpha condition detection device 110 will send a condition detection signal 130 to an intermediate module 135, and similarly the beta condition detection device 115 will send a condition detection signal 140 to the same intermediate module 135.

The intermediate module 125, located in the first component 100, has the job of determining, based upon the component condition indicated by the condition detection signal 120, what urgency category the component condition falls into. If only one urgency category is possible for the first component 100, then the intermediate module 125 has a very easy job, and essentially just passes through the condition detection signal 120. In this case, the intermediate module 125 would typically be a simple wire. But, if the first component 100 can experience a variety of component conditions that span two or more urgency categories, then the intermediate module 125 has a job that is not so easy. For example, if the first component 100 is an intelligent stacker trayer (IST), then the component condition could be a 50% full condition falling within a lower category of urgency than an 85% full condition, which in turn has a lower category of urgency than a 100% full condition.

The intermediate module 125 provides an urgency category signal 145 to a visual signal device 155 that in turn emits a visual category signal 160. This visual signal device 155 may, for example, be a light emitting diode (LED), and the visual category signal 160 may be a slow blink for low urgency (i.e. soft fault), a fast blink for medium urgency (i.e. firm fault), and a solid light for highest urgency (i.e. hard fault). So, for example, the 50% full IST or a low hopper would cause a slow blink, the 85% full IST or an open interlock would cause a fast blink, and the 100% full IST or a jam would cause a solid light. The slow blink, fast blink, or solid light categories of urgency are also triggered by a variety of other respective conditions, that vary from one module to the next, and, within a module, from one component to the next. A failure to feed onto the chassis or insertion engine components triggers a solid light, whereas a fast blink is triggered by an almost full conveyor in the output.

The visual category signal 160 can alternatively utilize different colors for different levels of urgency. The visual signal device 170 of the second component 150 operates in the same way, producing a visual category signal 175 in response to an urgency category signal 180. If the visual signal device 155 of the first component 100 is an LED using a blinking system to indicate categories of urgency, then the visual signal device 170 of the second component 150 also uses a blinking LED system.

Different colors may also be used as an indicator as to the location and/or nature of the failure. For example a problem with a full IST could be indicated by a green light, while a jamming problem could be indicated by an amber light. The blink rate and the color coding systems may be combined to show both the level of urgency and a more quickly recognizable indication of the specific nature of the problem.

Each of the two components shown in FIG. 1 thus employs the same basic method. The steps are: detecting 200 a component condition, sending 210 a condition detection signal indicative of the component condition, receiving 220 the condition detection signal, providing 230 an urgency category signal, receiving 240 the urgency category signal, and providing 250 a visual category signal indicative of one of at least two urgency categories that differ from zero urgency.

For personnel who are not positioned where they can see all of the visual signal devices, it may be convenient to add a consolidated signal device 185 as shown in FIG. 1. Signal device can be an LED, a CRT screen, or any kind of display that is capable of providing a visual indication to an operator. This device can advantageously be located on top of the inserter, or at some other position remote from the rest of the inserter. Such a consolidated signal device 185 conveys information about the visual category signal 160 of the first component 100, and also about the visual category signal 175 from the second component 150, for example by emitting a signal substantially the same as the more urgent of those two signals. Alternatively, the consolidated signal device 185 can form a light tree consisting of several LEDs of various colors showing a global system status, for example as follows: all lights off indicates unreadiness, a green blink indicates readiness, a green solid light indicates a running state, amber solid light indicates a hard fault and/or a stopped state, and a blue blink indicates a need for assistance. However the consolidated signal device is implemented in a best embodiment, that could generally be accomplished by routing the urgency category signals not just to the visual signal devices, but also to the consolidated signal device, as shown in FIG. 1.

Referring again to the alpha condition detection device 110 and the beta condition detection device 115, according to the best mode embodiment, if those devices send simultaneous condition detection signals then the intermediate module 135 must not only figure out which urgency category corresponds to each signal, but must also determine the highest of those urgency categories. The intermediate module 135 will then emit an urgency category signal 180 which reflects that highest urgency category.

Certain changes may be made in the best mode described above, and in its various embodiments, without departing from the scope of the invention, as will be understood by those skilled in the art. The invention disclosed herein can be implemented by a variety of combinations of hardware and software, and those skilled in the art will understand that those implementations are derivable from the invention as disclosed herein. For example, the intermediate module 125 of the first component 100 may be implemented by a central processing unit that also implements the intermediate module 135 of the second component 150. Moreover, it is intended that all matter contained in the above description or shown in the accompanying drawings shall be interpreted as illustrative and not in a limiting sense. Thus, additional features may be added, such as display screens providing detailed information beyond the general categorical information provided by the visual category signals.

What is claimed is:

1. An inserter machine including a plurality of modules, each of the modules having a plurality of components that may cause the inserter machine to stop, or function less than optimally, unless attention is provided based upon a level of urgency, each of at least two of the plurality of components comprising:

at least two urgency categories;

at least one condition detection device, for detecting a component condition, and for sending a condition detection signal indicative of the component condition;

at least one intermediate means, responsive to the condition detection signal, for providing an urgency category signal; and a visual signal device, responsive to the urgency category signal, for providing a visual category signal indicative of one of at least two urgency categories.

2. The inserter machine of claim 1, wherein the intermediate means is designed to provide the urgency category signal based upon selecting from the at least two urgency categories.

3. The inserter machine of claim 1, wherein the intermediate means of at least one of the plurality of components is for passing through the condition detection signal, in which case the condition detection signal is substantially identical to the urgency category signal for the at least one of the plurality of components.

4. The inserter machine of claim 1, wherein the visual category signal has a substantially similar appearance for each one of the urgency categories, regardless of the visual signal device from which the visual category signal emanates, and wherein the visual signal device is located in proximity to where the attention is required at the component.

5. The inserter machine of claim 1, wherein the visual signal device is color coded indicative of the component or the component condition that is being detected.

6. The inserter machine of claim 2, wherein the intermediate means selects a higher urgency category if the intermediate means receives a plurality of the condition detection signals indicating that a plurality of the component conditions, falling within a plurality of the urgency categories, have been detected, and wherein the higher urgency category is indicated by the urgency category signal provided by the intermediate means.

7. The inserter machine of claim 4, further comprising a consolidated signal device, for providing consolidated visual information about the visual category signals emanating from the plurality of components, wherein the consolidated signal device is positioned relative to the rest of the inserter machine so that the consolidated visual information is visible from places where at least one of the visual category signals is not visible.

8. The inserter machine of claim 7, wherein the consolidated signal device is located on top of the inserter machine, or at a location remote from the rest of the inserter machine.

9. The inserter machine of claim 1, wherein the visual category signal is selected from a group comprising a slow blink indicating slight urgency, a fast blink indicating moderate urgency, and a solid light indicating high urgency.

10. The inserter machine of claim 1, wherein the visual category signal is a solid light having a color indicative of the urgency category.

11. The inserter machine of claim 1, wherein at least one of the urgency categories encompasses a plurality of different component conditions.

12. A method for preventing each of a plurality of components in an inserter machine from causing the inserter machine to stop, or function less than optimally, due to lack of attention provided based upon a level of urgency, said method comprising the steps of:

detecting a component condition, sending a condition detection signal indicative of the component condition, providing an urgency category signal in response to the condition detection signal, providing a visual category signal, in response to the urgency category signal, indicating one of at least two urgency categories that differ from zero urgency.

13. The method of claim 12, wherein the step of providing the urgency category signal is provided based upon selecting from the at least two urgency categories that differ from zero urgency.

14. The method of claim 12, wherein the step of providing the urgency category signal is for passing through the condition detection signal, in which case the condition detection signal is substantially identical to the urgency category signal.

15. The method of claim 12, wherein the visual category signal has a substantially similar appearance for each one of the urgency categories, regardless of where the visual category signal emanates from, and regardless of where the attention is required, and wherein the visual category signal emanates from a location in proximity to where the attention is required.

16. The method of claim 13, wherein the urgency category signal indicates a higher urgency category if the step of receiving the condition detection signal indicates that a plurality of the component conditions, falling within a plurality of the urgency categories, have been detected.

17. The method of claim 15, further comprising the step of providing consolidated visual information about the visual category signals, wherein the consolidated visual information is visible from positions where at least one of the visual category signals is invisible.

18. The method of claim 17, wherein the consolidated visual information emanates from atop the inserter machine, or from a location remote from the rest of the inserter machine.

19. The method of claim 12, wherein the visual category signal is selected from a group comprising a slow blink indicating slight urgency, a fast blink indicating moderate urgency, and a solid light indicating high urgency.

20. The method of claim 12, wherein the visual category signal is a solid light having a color indicative of the urgency category.

21. The method of claim 12, wherein at least one of the urgency categories encompasses a plurality of different component conditions.

22. The method of claim 12, wherein the visual signal device is color coded indicative of the component or the component condition that is being detected.

* * * * *